United States Patent
Nouh et al.

(10) Patent No.: US 12,182,050 B2
(45) Date of Patent: Dec. 31, 2024

(54) SYSTEMS AND METHODS FOR ALIGNING RECEIVED DATA

(71) Applicant: Intel Corporation, Santa Clara, CA (US)

(72) Inventors: Hazem Mohamed Taher Nouh, Bayan Lepas (MY); Choon Yee Tan, Bukit Mertajam (MY)

(73) Assignee: Altera Corporation, San Jose, CA (US)

( * ) Notice: Subject to any disclaimer, the term of this patent is extended or adjusted under 35 U.S.C. 154(b) by 951 days.

(21) Appl. No.: 17/032,560

(22) Filed: Sep. 25, 2020

(65) Prior Publication Data
US 2021/0011874 A1    Jan. 14, 2021

(51) Int. Cl.
*G06F 13/40*    (2006.01)
*G06F 13/42*    (2006.01)

(52) U.S. Cl.
CPC ...... *G06F 13/4059* (2013.01); *G06F 13/4068* (2013.01); *G06F 13/4295* (2013.01)

(58) Field of Classification Search
CPC ............. G06F 13/4059; G06F 13/4068; G06F 13/4295
See application file for complete search history.

(56) References Cited

U.S. PATENT DOCUMENTS 7,151,470 B1 *  12/2006  Xue .................. H03M 7/04
                                                     341/95
9,111,042 B1 *  8/2015   Mendel ............... G06F 13/385

OTHER PUBLICATIONS

JEDEC Solid State Technology Association; Serial Interface for Data Converters JESD204C; Dec. 2017; pp. 1-294.

* cited by examiner

*Primary Examiner* — David E Martinez
(74) *Attorney, Agent, or Firm* — Fletcher Yoder, P.C.

(57) ABSTRACT

The present application is directed to an electronic device that includes a receiver configured to receive data from a second electronic device. The data includes a plurality of blocks, and each block of the plurality of blocks comprises a sync header. The receiver is also configured to align the data by performing 2 to 1 multiplexing and output the aligned data.

13 Claims, 7 Drawing Sheets

SYSTEMS AND METHODS FOR ALIGNING RECEIVED DATA

BACKGROUND

This disclosure relates to communication between integrated circuits. More particularly, this disclosure relates to aligning received data.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it may be understood that these statements are to be read in this light, and not as admissions of prior art.

Integrated circuits, such as programmable logic devices may include receivers that receive data from other circuitry, such as other integrated circuits. The other circuitry may include a converter, such as an analog-to-digital converter (ADC) that converts data from an analog domain to a digital domain. The other circuitry may also include a transmitter. The receiver of the integrated circuitry (e.g., programmable logic device) may perform various operations to identify portions of the data.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

One or more specific embodiments will be described below. In an effort to provide a concise description of these embodiments, not all features of an actual implementation are described in the specification. It may be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it may be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the phrase A "based on" B is intended to mean that A is at least partially based on B. Moreover, unless expressly stated otherwise, the term "or" is intended to be inclusive (e.g., logical OR) and not exclusive (e.g., logical XOR). In other words, the phrase A "or" B is intended to mean A, B, or both A and B.

Integrated circuits, such as programmable logic devices, may communicate with other electronic circuitry. For example, programmable logic devices such field programmable gate arrays (FPGAs) and application-specific integrated circuits (ASICs) may receive data from other circuitry as well as transmit data to the other circuitry (e.g., another integrated circuit). The integrated circuit may include a receiver that detects boundaries defined within received data. The present application is generally directed to techniques that may be utilized align received data, such as data received by a receiver of an integrated circuit. More specifically, the techniques described herein enable data to be aligned based on detecting boundaries (e.g., sync headers) within the data received by a receiver of an integrated circuit. For example, the techniques described herein may be utilized in conjunction with electronic devices described in JEDEC Standard JESD204C ("Serial Interface for Data Converters") and for data transmitted and received in accordance with the JESD204C standard.

Figure 1:
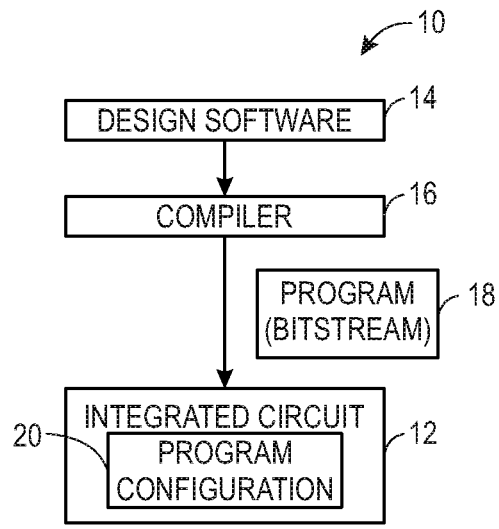
FIG. 1 is a block diagram of a programmable logic device that is programmed with a circuit design, in accordance with an embodiment.

By way of introduction, FIG. 1 illustrates a block diagram of a system 10 that includes a programmable logic device 12 that may detect boundaries in received data and align the received data as described herein. Using the system 10, a designer may implement a circuit design functionality on an integrated circuit, such as a reconfigurable programmable logic device 12, such as a field programmable gate array (FPGA). The designer may implement a circuit design to be programmed onto the programmable logic device 12 using design software 14, such as a version of Intel® Quartus® by Intel Corporation of Santa Clara, California. The design software 14 may use a compiler 16 to generate a low-level circuit-design defined by bitstream 18, sometimes known as a program object file and/or configuration program that programs the programmable logic device 12. Thus, the compiler 16 may provide machine-readable instructions representative of the circuit design to the programmable logic device 12. For example, the programmable logic device 12 may receive one or more configuration programs (bitstreams) 18 that describe the hardware implementations that should be stored in the programmable logic device 12. A configuration program (e.g., bitstream) 18 may be programmed into the programmable logic device 12 as a program configuration 20. The program configuration 20 may, in some cases, represent an accelerator function to perform a specialized task, such as video processing, voice recognition, image recognition, vehicle-to-vehicle communication, or other highly specialized tasks. These specialized task may be used in wireless applications, such as for wireless devices operating in a 5G network.

Figure 2:
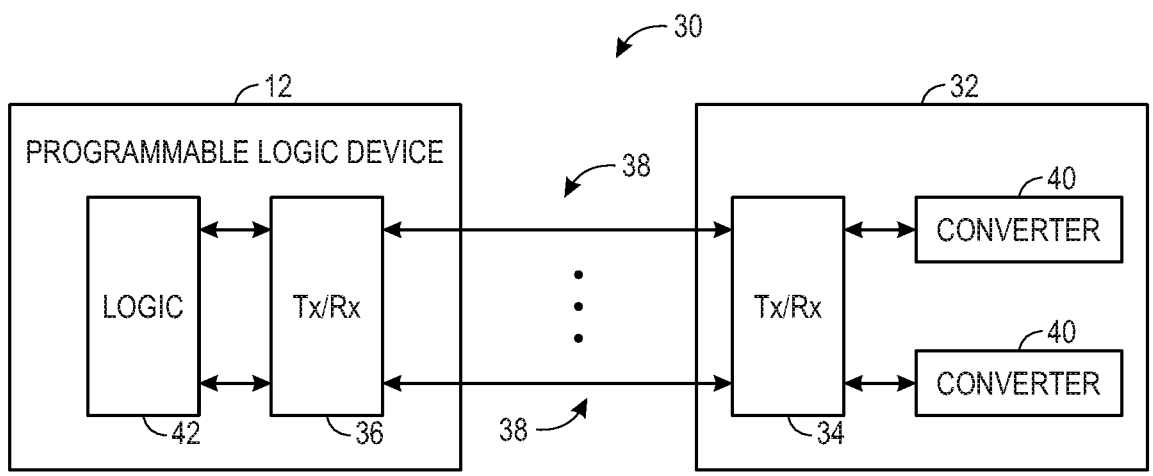
FIG. 2 is a block diagram illustrating communication between the programmable logic device of FIG. 1 and other electronic circuitry, in accordance with an embodiment.

Integrated circuits such as the programmable logic device 12 may communicate with other integrated circuits or electronic circuitry. FIG. 2 is a schematic diagram of a system 30 in which the programmable logic device 12 is communicatively coupled to, and communicates with, other circuitry 32. The other circuitry 32 may include, but is not limited to, integrated circuits and circuit boards (e.g., printed circuit boards (PCBs) or components thereof (e.g., circuitry included in another integrated circuit or a PCB). As illustrated, the other circuitry 32 includes a transceiver 34 which may communicate with a transceiver 36 of the programmable logic device 12. For example, when the other circuitry 32 is sending data to the programmable logic device 12, the transceiver 34 may function as a transmitter that sends the data to the programmable logic device 12 (e.g., via one or more links 38), in which case the transceiver 36 functions as a receiver. As another example, the transceiver 36 of the programmable logic device 12 may function as a transmitter to send data to the other circuitry 32. In such a case, the transceiver 34 functions as a receiver. Furthermore, it should be noted that, while the programmable logic device 12 and other circuitry 32 are respectively depicted as transceivers 36, 34 that may provide receiver and transmitter functionalities, in other embodiments, separate transmitters and receivers may be utilized.

The other circuitry 32 may include one or more converters 40 that convert data to be communicated to the programmable logic device 12 or received from the programmable logic device 12. For example, the converters 40 may be analog-to-digital converters (ADCs) that convert data from an analog domain to a digital domain. As another example, the converters 40 may be digital-to-analog converters (DACs) that convert data from a digital domain to an analog domain. More particular, in embodiments in which the programmable logic device 12 is an FPGA, the converters 40 may include ADCs that convert data to be sent via the transceiver 34 to the programmable logic device 12 from analog to digital, DACs that convert data received from the programmable logic device 12 via the transceiver 34 from digital to analog, or both.

The transceiver 36 of the programmable logic device 12 may be communicatively coupled to logic 42, which may include programmable logic elements included within the programmable logic device. For example, the logic 42 may be a hardware implementation described by the bitstreams 18. The logic 42 may process communications received via the transceiver 36 and provide data to the transceiver 36 to be transmitted to the other circuitry 32. For instance, the logic 42 may include circuitry that performs an accelerator function to perform a specialized task, such as video processing, voice recognition, image recognition, vehicle-to-vehicle communication, or other highly specialized tasks. The transceiver 36 may communicate data generated from performing such functions to the other circuitry 32.

Keeping the foregoing in mind, the discussion will turn largely to data and data processing that the transceiver 36 of the programmable logic device 12 may perform, for example, when receiving data from the other circuitry 32. In other words, the techniques discussed below may be performed by a receiver (e.g., transceiver 36) of an integrated circuit such as the programmable logic device 12.

Figure 3:
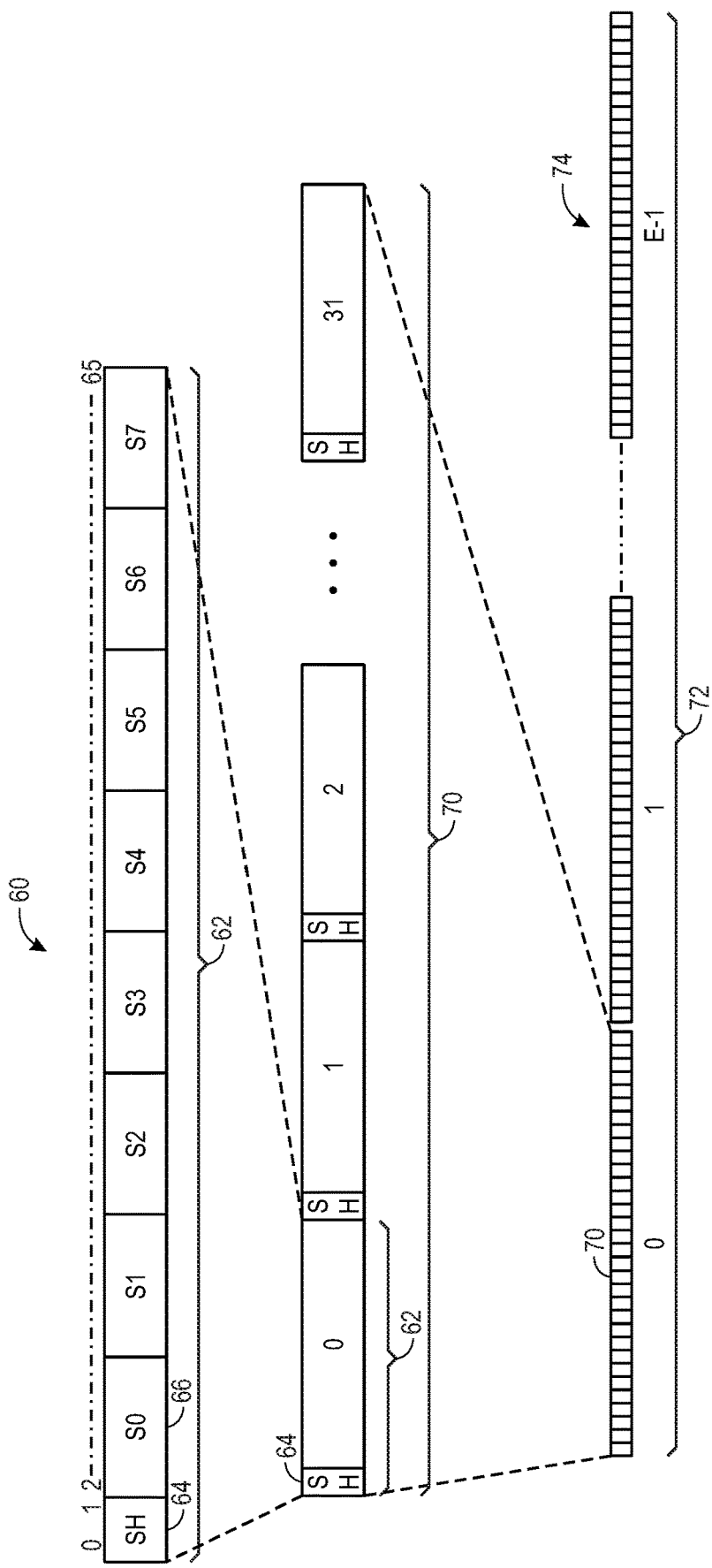
FIG. 3 is a schematic diagram of several arrangements of data, in accordance with an embodiment.

Data transmitted to the transceiver 36 of the programmable logic device 12 may be described as having a block structure. For example, FIG. 3 is a schematic diagram of several arrangements of data 60, which includes a block 62 of data. The blocks 62 include a sync header 64, which may include two bits of data, and several sub-blocks of data (e.g., first sub-block 66), which may each include eight bits of data. The sync header 64 may indicate the beginning of the block 62. That is, the sync header 64 may indicate a subdivision within data 60 received from the other circuitry 32. Accordingly, the block 62 may include sixty-six total bits, two of which are included the sync header 64 and sixty-four of which are the underlying data (e.g., data communicated to the programmable logic device 12 for processing by the logic 42).

Blocks 62 of the data 60 may be arranged in multiblocks, such as multiblock 70, which is also depicted in FIG. 3. For example, in the illustrated embodiment, thirty-two blocks of data may be concatenated to form the multiblock 70. As illustrated, each block 62 included in the multiblock 70 is separated from other blocks 62 by a sync header 64.

Multiblocks 70 may also be grouped together to form extended multiblocks, such as an extended multiblock 72, as illustrated in FIG. 3. Extended multiblocks 72 may include E multiblocks 70, where E is an integer equal to or greater than one. Also shown in FIG. 3 is an end of an extended multiblock 72, which may be the last multiblock 70 (E-1) included in an extended multiblock 72. As discussed below, the transceiver 36 may determine where the end of an extended multiblock 72 is located in data received from the other circuitry 32.

Figure 4:
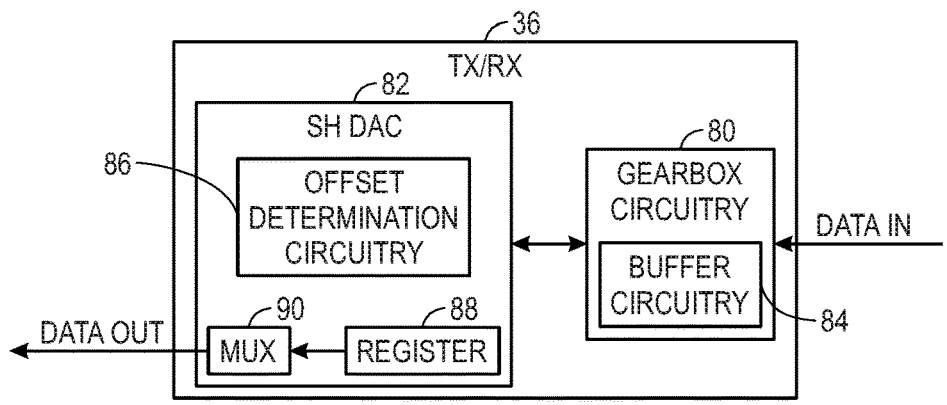
FIG. 4 is a block diagram of a receiver of the programmable logic device of FIG. 2, in accordance with an embodiment.

As the transceiver 36 receives the data 60 (e.g., from the other circuitry 32), the transceiver 36 may process the data 60 to determine subdivisions in the data 60, for example, to align encoded data. As discussed herein, the transceiver 36 may include circuitry that executes instructions to determine the location of sync headers within received data 60 and aligns the received data 60. Bearing this in mind, FIG. 4 is a block diagram of the transceiver 36 of the programmable logic device 12. As illustrated, the transceiver 36 includes gearbox circuitry 80 that receives incoming data (e.g., data sent from the other circuitry 32). The transceiver 36 also includes sync header detection and alignment circuitry 82, which may receive data from the gearbox circuitry 80 and output aligned data to other circuitry of the programmable logic device 12, such as the logic 42.

Figure 5:
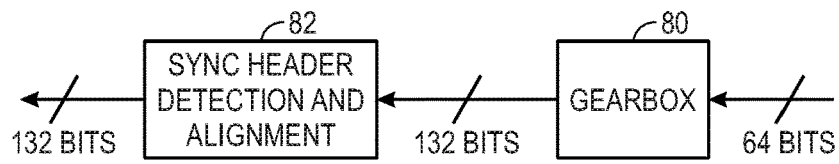
FIG. 5 is a diagram illustrating amounts of data received and output by gearbox circuitry and sync header detection and alignment circuitry of FIG. 4, in accordance with an embodiment.

The gearbox circuitry 80 receives data (e.g., data 60) and generally outputs a different amount of data. For example, the gearbox circuitry 80 includes buffer circuitry 84 that may store received data until a certain amount of data can be provided to the sync header detection and alignment circuitry 82. To help explain further, FIG. 5 is provided. In particular, FIG. 5 a diagram illustrating amounts of data received and output by the gearbox circuitry 80 and sync header detection and alignment circuitry 82. As shown in FIG. 5, the gearbox circuitry 80 receives sixty-four bits of data. As such, the gearbox circuitry 80 may be said to be a "sixty-four bit gearbox" (e.g., a sixty-four bit interface tile). The gearbox circuitry 80, as illustrated, outputs 132 bits of data. The 132 bits of data may be two blocks 62 of data (i.e., two sixty-six bit blocks 62). Accordingly, the gearbox circuitry 80 may receive data from several blocks 62 of data and output the data. As discussed below, the gearbox circuitry 80 may arrange received data into one of a limited number of possible configurations and provide the arranged data to the sync header detection and alignment circuitry 82, which aligns the data.

Before returning to FIG. 4, it should be noted that the gearbox circuitry 80 may receive and output different amounts of data. Generally speaking, the techniques described herein are applicable in cases in which the gearbox circuitry 80 receives a different number of bits of data compared to the size of the blocks 62 of data. For example, in the embodiment discussed above, the gearbox circuitry 80 has been described as a sixty-four bit gearbox that receives blocks 62 of data that include sixty-six bits. However, the techniques described herein may be applied to, and utilized, in many different examples in which the gearbox circuitry 80 is a different "size" than the number of bits included in blocks of received data.

With that said, because the amount of data the gearbox circuitry 80 receives is different than the amount of data included in each of the blocks 62, there may be a "shift" or "offset" in the data as the data is received by the gearbox circuitry 80 from the transceiver 34 of the other circuitry 32, and this shift or offset may propagate into data sent from the gearbox circuitry 80 to the sync header detection and alignment circuitry 82. For instance, as described in more detail below, initially received data may include an "initial shift" in which a sync header 64 is located in a bit positions other than bit 0 and bit 1. Moreover, because the number of bits (e.g., sixty-four bits) included in the input of the gearbox circuitry 80 is different than the number of bits (e.g., multiples of sixty-six bits (e.g., two blocks of sixty-six bits totaling 132 bits)) in a block of data, the data received by the gearbox circuitry 80 may appear to shift because the location of the sync headers 64 within the received data may move (e.g., have different bit positions in received blocks 62 of data). For instance, the shift may be equal to two bits per clock cycle (e.g., caused by a sixty four bit input vs. a sixty-six bit output (e.g., two sixty-six bit blocks 62 of data)). Furthermore, while the sync header detection and alignment circuitry 82 may be able to partially account for this difference by outputting data in which sync headers 64 are located at the same bit positions within each sixty-six bits of data, the sync headers 64 may be located at any two consecutive bits in initially received data (e.g., within sixty-six bits of received data). Because sync headers 64 may be located at any two consecutive bit positions in each block 62 of data received from the gearbox 80, the sync header detection and alignment circuitry 82 may evaluate each combination of two adjacent bits to determine the location of a sync header 64 within each block 62 of data. The techniques described herein enable the receivers of integrated circuits, such as the transceiver 36, to account for such an initial shift and align the received data. Indeed, as described in more detail below, an initial shift may be taken into account in a manner than enables the sync header detection and alignment circuitry 82 to receive data in which the sync header 64 for each block 62 of data is located in one of two locations, thereby enabling the sync header detection and alignment circuitry 82 to more quickly align the data.

Turning back to FIG. 4, the sync header detection and alignment circuitry 82 includes offset determination circuitry 86, a register 88, and multiplexer circuitry 90. The offset determination circuitry 86 performs several functions. In particular, the sync header detection and alignment circuitry 82 may receive data from the gearbox circuitry 80, determine the location of a sync header 64 in the received data, and determine an offset (e.g., shift) between an actual location of the sync header 64 and a desired location for the sync header 64. As described below, the sync header detection and alignment circuitry 82 may provide an indication of the desired location to the gearbox circuitry 80 so that data provided by the gearbox circuitry 80 to the sync header detection and alignment circuitry 82 is arranged in one of two possible arrangements. More specifically, the sync headers 64 in the data the sync header detection and alignment circuitry 82 receives from the gearbox circuitry 80 will be located in one of two possible locations.

The register 88 stores data, such as data from a previous block 62 of data. The data stored in the register 88 may be a single bit, thereby enabling a rather small register to be utilized. For example, the register 88 may store a single bit from one block 62 of data. The data from the register 88 and a current set of data (e.g., two sixty-six bit blocks 62 of data) may be provided as inputs to the multiplexer circuitry 90.

The multiplexer circuitry 90 further aligns the data (e.g., two sixty-six bit blocks 62 of data) by utilizing the registered bit of data to determine which configuration the data has and output aligned data. For example, the multiplexer circuitry 90 may include 2:1 multiplexers that receive two bits of data and output one bit of data. The multiplexer circuitry 90 may receive 133 bits of data as an input (e.g., the registered bit from the register 88 and two sixty-six bit blocks 62 of data) and output 132 bits of data (e.g., two sixty-six blocks 62 of data) that are aligned. More specifically, the data output by the multiplexer circuitry 90 may be aligned so that the sync headers 64 are located in the same bit positions in each block 62 of data. More specifically, the sync headers 64 are considered to be aligned when the sync headers 64 occupy the zeroth and first bit positions (e.g., bit 0 and bit 1) of each block 62 of data. In other words, bit 0, bit 1, bit 66, and bit 67 of a 132-bit output from the multiplexer circuitry 90 will include sync header bits for two blocks 62 of aligned data. In this manner, sync header detection and alignment circuitry 82 is able to align data.

Figure 6:
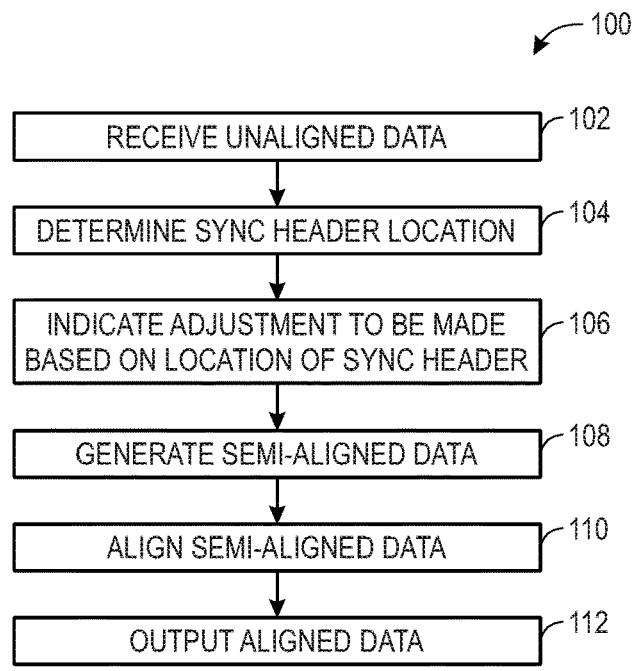
FIG. 6 is a flow diagram of a process for aligning received data, in accordance with an embodiment.

Keeping the discussion of FIG. 4 and FIG. 5 in mind, FIG. 6 is a flow diagram of a process 100 for aligning received data. The process 100 may be performed by the transceiver 36 of the programmable logic device 12 on data (e.g., data 60) received from the other circuitry 32, for example, by executing instructions stored on the programmable logic device 12. More specifically, as discussed below, operations of the process 100 may be performed by the gearbox circuitry 80 and the sync header detection and alignment circuitry 82 of the transceiver 36. The process 100 includes receiving unaligned data (process block 102), determining a sync header location (process block 104), indicating an adjustment to be made based on the location of the sync header (process block 106), generating semi-aligned data (process block 108), aligning the semi-aligned data (process block 110), and outputting aligned data (process block 112).

At process block 102, the transceiver 36 receives unaligned data. For example, the transceiver 36 may receive data from the other circuitry 32 that includes several blocks 62 or multiblocks 72 of data. More specifically, the gearbox circuitry 80 may receive the data and, as described above, store some of the data in the buffer circuitry 84 before providing data to the sync header detection and alignment circuitry 82. The sync headers 64 within the received data may be located at any bit positions within the data that can shift over time (e.g., with each clock cycle). Accordingly, the received data may be "unaligned."

Figure 7:
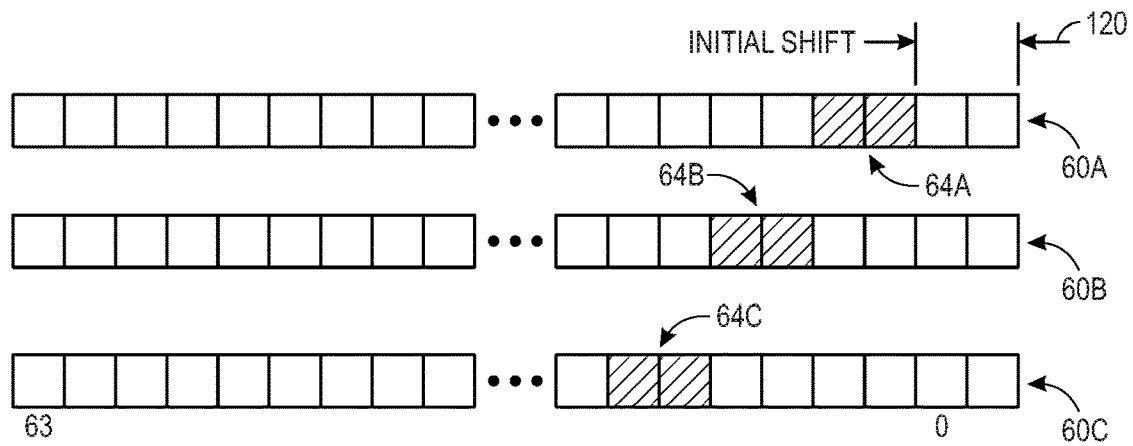
FIG. 7 is a diagram illustrating a shift of the location of sync headers across successive pieces of received data, in accordance with an embodiment.

To help further explain data being unaligned, FIG. 7 is provided. In particular, FIG. 7 is a diagram illustrating a shift of the location of the sync header 64 across successive pieces of received data 60. As described above, the gearbox circuitry 80 may receive sixty-four bits of data at a time (e.g., per clock cycle). Accordingly, data 60A, 60B, 60C included in FIG. 7 may be three successive pieces of data received by the gearbox circuitry 80 (e.g., from the other circuitry 32).

The location of sync headers 64 within the data the gearbox circuitry 80 receives may be random. In other words, sync headers 64 in received data may occupy any two bits of the received data (e.g., any two bit positions within each sixty-six bits of received data). In cases in which sync headers 64 are not located at the zeroth and first bit positions in received data, an "initial shift" may be said to be present. For example, an initial shift 120 of bits exists in the data 60A because sync header 64A is positioned two bits away from the zeroth and first bit positions of the data 60A. Furthermore, due to the input (e.g., sixty-four bits of data) into the gearbox circuitry 80 being a different size than the output (e.g., a multiple of sixty-six bits, such as two sixty-six bit blocks 62 of data), the location of sync headers 64 within the received data shifts. For example, as illustrated, sync header 64B has shifted in location bits relative to the location of sync header 64A. Likewise, sync header 64C has shifted two bits relative to the location of the sync header 64B. By performing the remaining operations of the process 100, the transceiver 36 may account for the initial shift 120 and align the received data so that the output of the transceiver (e.g., an output provided to the logic 42) includes data in which sync headers 64 occupy the same bit positions (e.g., bit 0 and bit 1 of each block 62 output by the transceiver 36).

Returning to FIG. 6, at process block 104, the sync header detection and alignment circuitry 82 determines a location of a sync header in the received data. For example, the gearbox circuitry 80 may output 132 bits of data, and the sync header detection and alignment circuitry 82 may receive the 132 bits of data and determine the locations of sync headers within the data. The sync header detection and alignment circuitry 82 may determine the location of the sync headers utilizing a sync header state machine that may be included in, or executed by, the sync header detection and alignment circuitry 82.

At process block 106, the sync header detection and alignment circuitry 82 indicates an adjustment to be made based on the location of the sync header determined at process block 104. In particular, the sync header detection and alignment circuitry 82 may determine an offset between the determined location of the bits of the sync header 64 and a desired location for the sync header 64. For example, referring the data 60A of FIG. 7, the sync header detection and alignment circuitry 82 may determine that the number of bits in the initial shift 120 (e.g., two bits) relative to bit 0 and bit 1 (e.g., a potential desired location) and cause an adjustment to be made to account for the initial shift 120.

For example, the sync header detection and alignment circuitry 82 may utilize the determined number of bits in the initial shift 120 to calculate a write pointer value that will cause the gearbox circuitry 80 to provide data to the sync header detection and alignment circuitry 82 that has the bits of each sync header generally located in one of two sets of bits. The sync header detection and alignment circuitry 82 may provide the write pointer value to the gearbox circuitry 80.

In response to receiving the indication of the adjustment, at process block 108, the gearbox circuitry 80 may generate semi-aligned data, which is data that has been aligned to have one of two possible patterns regarding the location of sync headers 64. More specifically, in response to receiving the write pointer value, gearbox circuitry 80 may reset the buffer circuitry 84 at a specific location so that the data at the desired write pointer is the first data to be written to the buffer circuitry 84 when out of the reset. For instance, the buffer circuitry 84 may be a first-in first-out (FIFO) buffer that, after being reset, begins to align data in the configuration 140A illustrated in FIG. 8A or the configuration 140B of FIG. 8B.

Figure 8A:
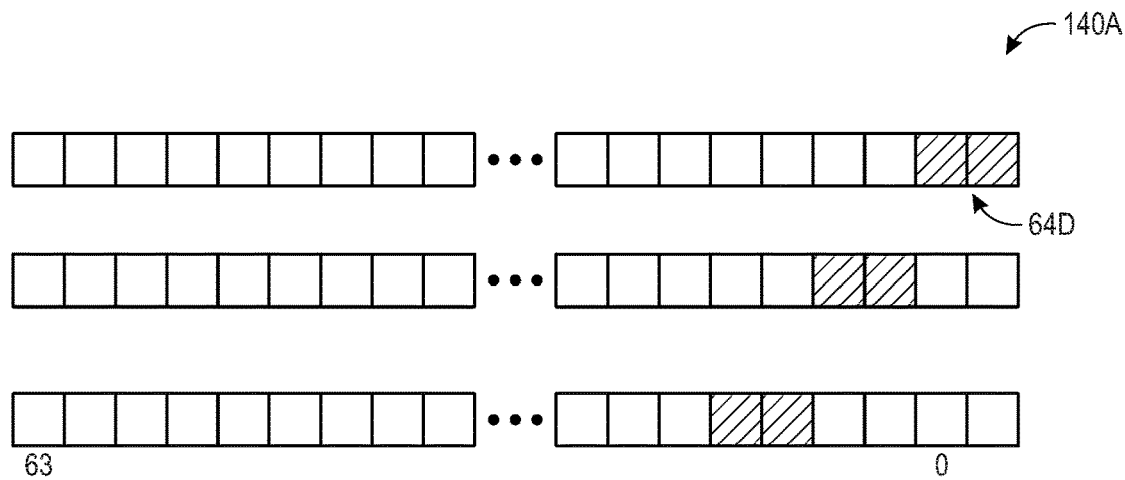
FIG. 8A illustrates a configuration that data received by the gearbox circuitry of FIG. 4 may have, in accordance with an embodiment.
Figure 8B:
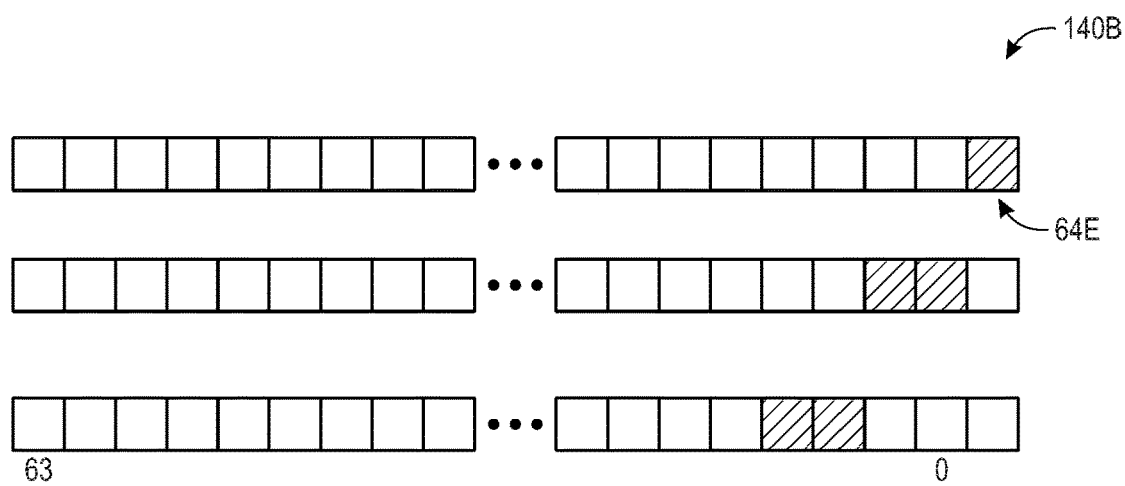
FIG. 8B illustrates another configuration that data received by the gearbox circuitry of FIG. 4 may have, in accordance with an embodiment.

In particular, FIG. 8A and FIG. 8B respectively illustrate the configurations 140A, 140B (e.g., alignment) that received data can have at the gearbox circuitry 80 by resetting the buffer circuitry 84. In other words, because the received data can be written to a specific location within the buffer circuitry 84, the received data can be aligned to have one of the two configurations 140A, 140B. As shown in FIG. 8A, the configuration 140A is one in which a sync header 64D for received data occupies bit 0 and bit 1. The configuration 140B differs from the configuration 140A in that the position of the sync header (e.g., sync header 64E) is shifted one bit. As such, the sync header 64E may initially be located in bit 0 of current data and bit 63 (i.e., the last bit) of the data (e.g., sixty-four bits of data) received immediately prior to the current data. In other words, the sync header 64 for a single block 62 of received data may be split across two different sixty-four bit pieces of received data.

As discussed above, due to the data received and output by the gearbox circuitry 80 having a different number of bits, there may be an offset. The gearbox circuitry 80 can account for such an offset so the data the gearbox circuitry 80 outputs includes sync headers 64 that are in the same positions within each output. In other words, sync headers 64 may occupy the same bit positions within each 132-bit output of the gearbox circuitry 80 that is provided to the sync header detection and alignment circuitry 82. Such outputs are the semi-aligned data discussed above. However, because the data the gearbox circuitry 80 receives can be written to the buffer circuitry 84 in two different ways, there are two potential alignments for the semi-aligned data. These alignments are shown in FIG. 9A and FIG. 9B.

Figure 9A:
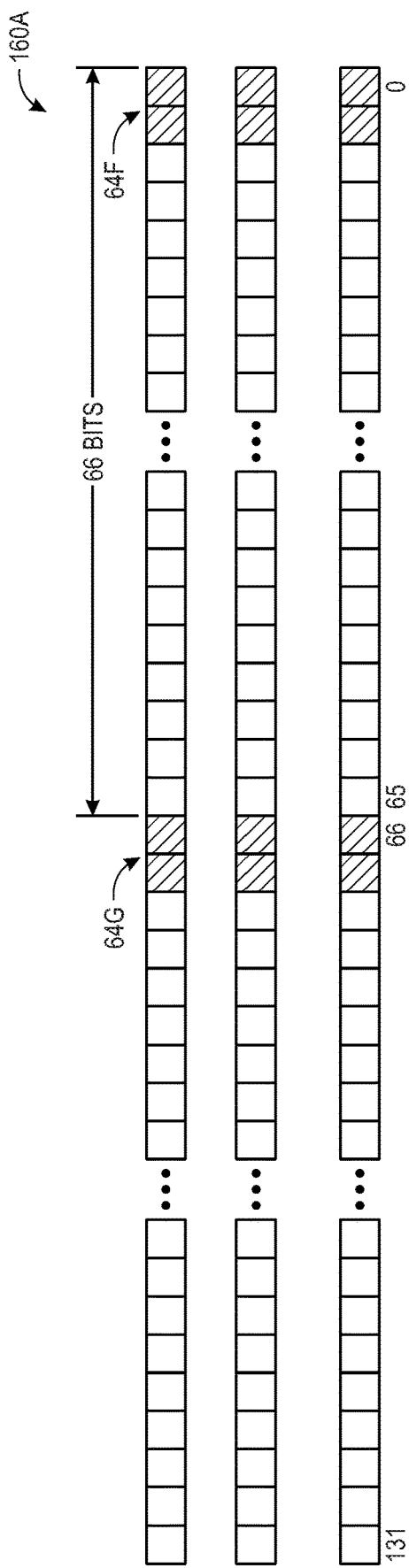
FIG. 9A illustrates semi-aligned data generated by the gearbox circuitry of FIG. 4, in accordance with an embodiment.
Figure 9B:
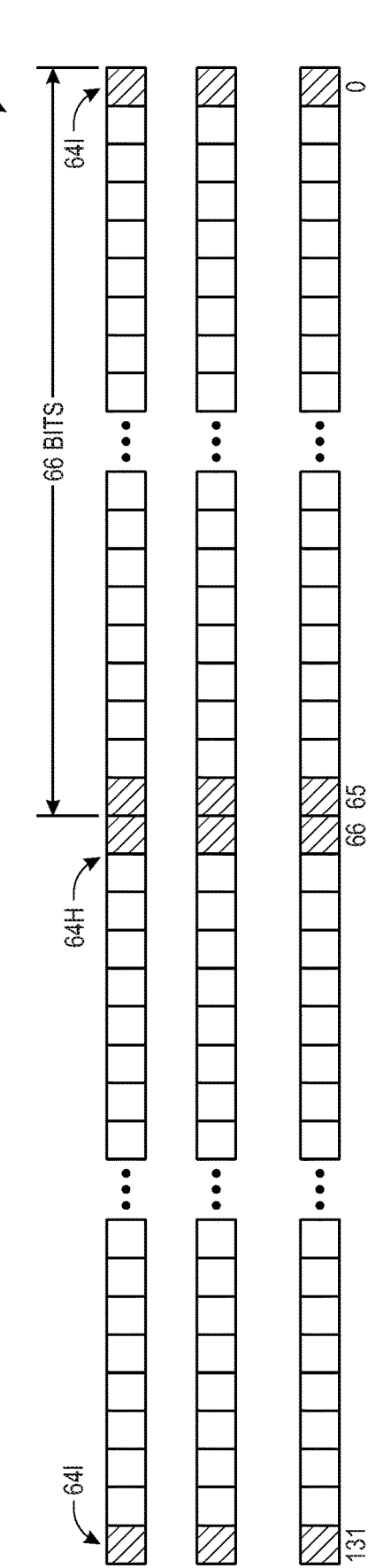
FIG. 9B illustrates other semi-aligned data generated by the gearbox circuitry of FIG. 4, in accordance with an embodiment.

More specifically, FIG. 9A shows semi-aligned data 160A, and FIG. 9B shows semi-aligned data 160B, both of which the gearbox circuitry 80 can output to the sync header detection and alignment circuitry 82. In the semi-aligned data 160A, sync headers 64F occupy the first two bits (e.g., bit 0 and bit 1) of each 132-bit output, and sync headers 64G occupy the sixty-seventh and sixty-eight bits (e.g., bit 66 and bit 67) of each 132-bit output. In other words, in the semi-aligned data 160A, sync headers 64 generally correspond to occupying the first two bits of each block 62 of data.

In semi-aligned data 160B, the bits of one sync header 64 are split between two 132-bit pieces of data (e.g., outputs of the gearbox circuitry 80), and another sync header is completely included within each 132-bit output. For instance, sync header 64H and a first bit of sync header 64I are included within a first 132-bit output. The second bit of the sync header 64I is included in a second 132-bit output that immediately follows the first 132-bit output. Accordingly, the gearbox circuitry 80 may align received data to generate data that is output to the sync header detection and alignment circuitry in one of two configurations (e.g., semi-aligned data 160A or semi-aligned data 160B).

Returning to FIG. 6 and the discussion of the process 100, at process block 110, the sync header detection and alignment circuitry 82 may align the semi-aligned data (e.g., semi-aligned data 160A, 160B). In other words, the sync header detection and alignment circuitry 82 may further align the semi-aligned data so that the sync headers 64 of the data are located at particular bit positions. More specifically, as discussed below with respect to FIG. 10 and FIG. 11, the multiplexer circuitry 90 may align the semi-aligned data utilizing the data (e.g., a single bit of data) stored in the register 88.

Figure 10:
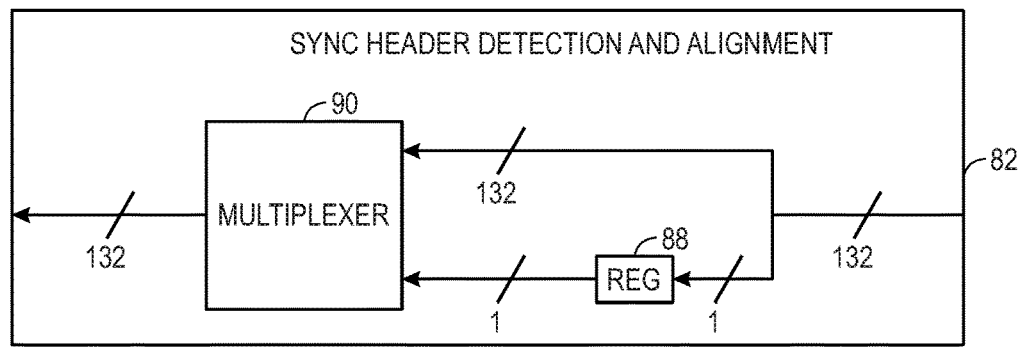
FIG. 10 illustrates the flow of data within the sync header detection and alignment circuitry of FIG. 4, in accordance with an embodiment.

FIG. 10 illustrates the flow of data within the sync header detection and alignment circuitry 82. As illustrated, the sync header detection and alignment circuitry 82 receives a 132-bit input, which may be referred to as a "current input". The 132-bit input is semi-aligned data 160A or semi-aligned data 160B generated by the gearbox circuitry 80. The 132-bit input is provided to the multiplexer circuitry 90 along with data from the register 88, which may be a single bit of data included in the 132-bit input received immediately prior to the current input, which may be referred to as a "previous input." More specifically, the bit of data stored in the register 88 may be the last bit (e.g., bit 131) of the previous input. Furthermore, the last bit of the current input may be stored in the register 88 (e.g., after the last bit of the prior input has been provided to the multiplexer circuitry 90).

The multiplexer circuitry 90 aligns the data of the current input to output aligned data, which may be arranged in the same manner as the semi-aligned data 160A. In other words, the multiplexer circuitry 90 may receive a 133-bit input and output 132 bits of aligned data that includes one sync header at bit 0 and bit 1 and another sync header at bit 66 and bit 67. Moreover, because the current input is either already aligned (e.g., in cases when the current input is semi-aligned data 160A) or is the semi-aligned data 160B, the current input may have one of two possible configurations.

Figure 11:
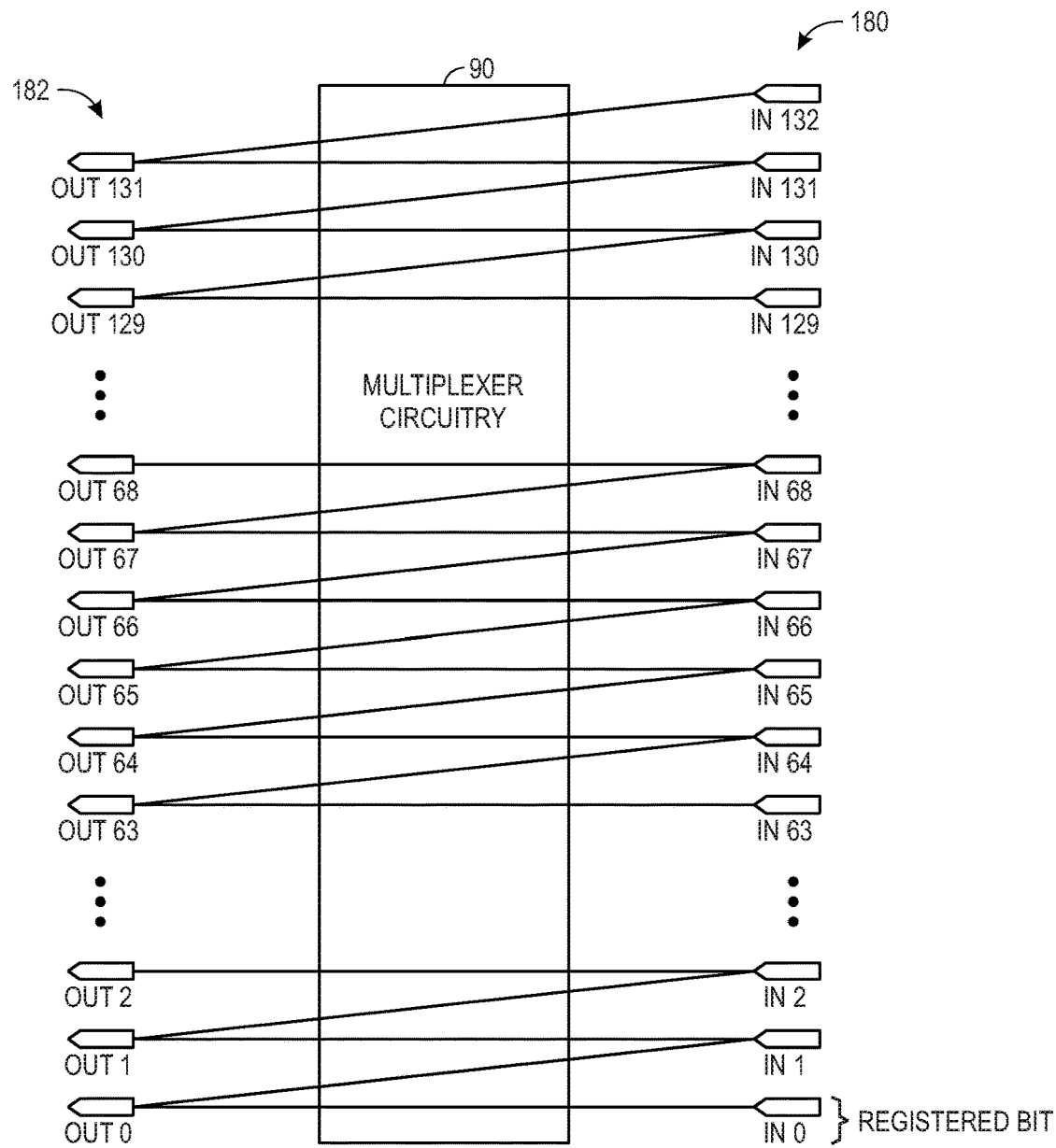
FIG. 11 is a diagram illustrating the multiplexing of received data by the multiplexer circuitry of FIG., in accordance with an embodiment.

Bearing this in mind, the multiplexer circuitry 90 may include several 2:1 multiplexers that are utilized to align the data. To help provide more detail on how multiplexing can be employed to align received data, FIG. 11 is provided. FIG. 11 shows how the data input (e.g., input data 180) to the multiplexer circuitry 90 can be output (e.g., as output data 182). As illustrated, the input data 180 includes the current input (e.g., 132 bits of semi-aligned data) and a single bit from the register 88 (the "registered bit"). The positions of the bits of the current input may be shifted (e.g., In1 shifted to Out0) or maintained based on whether the registered bit is included within the output data 182. For example, when the current data is semi-aligned data 160A, the multiplexer circuitry 90 excludes the registered bit from the output data 182 so that the output data 182 (e.g., aligned data) included two complete sync headers 64. For instance, the sync headers 64 of the output data 182 may be located at bit 0 (e.g., "Out0"), bit 1 (e.g., "Out1"), bit 66 (e.g., "Out66"), and bit 67 (e.g., "Out67").

In the case of the current data being the semi-aligned data 160B, the multiplexer circuitry 90 may include the registered bit in the output data 182 so that the first two bits of the output data 182 include a sync header. In such case, the last bit of the current data (e.g., "In132") will be excluded from the output data 182. However, this bit may be stored in the register 88 and included in a subsequent output.

Returning to FIG. 6 and the discussion of the process 100, at process block 112, the transceiver 36 may output aligned data. More specifically, the output of the multiplexer circuitry 90 (i.e., the aligned data) may be provided to another portion of the programmable logic device 12, such as the logic 42.

By taking into account the location of sync headers within received data, the received data can be arranged into a limited number of configurations, which may reduce the size of the multiplexer circuitry 90 and the amount of multiplexing performed by the sync header detection and alignment circuitry 82 to align the data compared to cases in which the location of sync headers is not taken into account. For example, because the data at the sync header detection and alignment circuitry 82 has one of two possible configurations, the multiplexer circuitry 90 may utilize only utilize 2:1 multiplexing operations (e.g., that are performed by 2:1 multiplexers). Whereas, in cases in which the position of sync headers is not taken into account, 66:1 multiplexing may be used. Because the current embodiments enable only 2:1 multiplexing to be performed, data may be aligned more quickly. Furthermore, the physical area on the programmable logic device 12 occupied by the multiplexer circuitry 90 (and sync header detection and alignment circuitry 82) may be reduced, thereby increasing the area on the programmable logic device 12 that may be utilized for other purposes. For instance, the area of the logic 42 may be enlarged to enhance the performance of the logic 42 (e.g., to perform processes that the logic 42 is programmed to execute).

Figure 12:
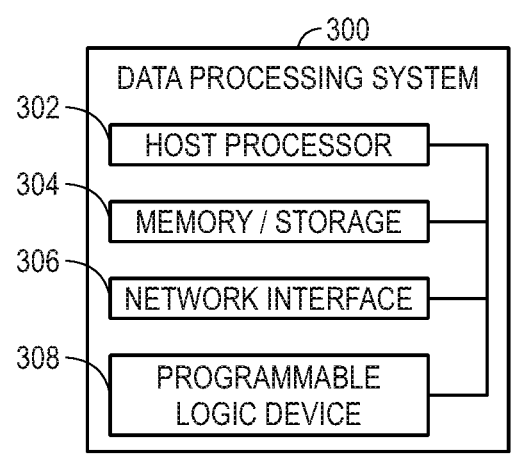
FIG. 12 is a block diagram of a data processing system that includes the programmable logic device of FIG. 1, in accordance with an embodiment.

With the foregoing in mind, the programmable logic device 12 may be a part of a data processing system or may be a component of a data processing system that may benefit from using the techniques discussed herein. For example, the programmable logic device 12 may be a component of a data processing system 300, shown in FIG. 12. The data processing system 300 includes a host processor 302, memory and/or storage circuitry 304, and a network interface 306. The data processing system 300 may include more or fewer components (e.g., electronic display, user interface structures, application specific integrated circuits (ASICs)).

The host processor 302 may include any suitable processor, such as an INTEL® XEON® processor or a reduced-instruction processor (e.g., a reduced instruction set computer (RISC), an Advanced RISC Machine (ARM) processor) that may manage a data processing request for the data processing system 300 (e.g., to perform machine learning, video processing, voice recognition, image recognition, data compression, database search ranking, bioinformatics, network security pattern identification, spatial navigation, or the like). The memory and/or storage circuitry 304 may include random access memory (RAM), read-only memory (ROM), one or more hard drives, flash memory, or the like. The memory and/or storage circuitry 304 may be considered external memory to the programmable logic device 12 and may hold data to be processed by the data processing system 300 and/or may be internal to the programmable logic device 12. In some cases, the memory and/or storage circuitry 304 may also store configuration programs (e.g., bitstream) for programming a programmable fabric of the programmable logic device 12. The network interface 306 may permit the data processing system 300 to communicate with other electronic devices. The data processing system 300 may include several different packages or may be contained within a single package on a single package substrate.

In one example, the data processing system 300 may be part of a data center that processes a variety of different requests. For instance, the data processing system 300 may receive a data processing request via the network interface 306 to perform machine learning, video processing, voice recognition, image recognition, data compression, database search ranking, bioinformatics, network security pattern identification, spatial navigation, or some other specialized task. The host processor 302 may cause a programmable logic fabric of the programmable logic device 12 to be programmed with a particular accelerator related to the requested task. For instance, the host processor 302 may instruct that configuration data (e.g., bitstream 18) be stored on the memory and/or storage circuitry 304 or cached in sector-aligned memory of the programmable logic device 12 to be programmed into the programmable logic fabric of the programmable logic device 12. The configuration data may represent a circuit design for a particular accelerator function relevant to the requested task.

The processes and devices of this disclosure may be incorporated into any suitable circuit. For example, the processes and devices may be incorporated into numerous types of devices such as microprocessors or other integrated circuits. Exemplary integrated circuits include programmable array logic (PAL), programmable logic arrays (PLAs), field programmable logic arrays (FPLAs), electrically programmable logic devices (EPLDs), electrically erasable programmable logic devices (EEPLDs), logic cell arrays (LCAs), field programmable gate arrays (FPGAs), application specific standard products (ASSPs), application specific integrated circuits (ASICs), and microprocessors, just to name a few.

Moreover, while the process operations have been described in a specific order, it should be understood that other operations may be performed in between described operations, described operations may be adjusted so that they occur at slightly different times or described operations may be distributed in a system which allows the occurrence of the processing operations at various intervals associated with the processing, as long as the processing of overlying operations is performed as desired.

EXAMPLE EMBODIMENTS

EXAMPLE EMBODIMENT 1. An electronic device comprising a receiver, wherein the receiver is configured to:
  receive data from a second electronic device, wherein the data comprises a plurality of blocks, wherein each block of the plurality of blocks comprises a sync header;
  align the data by performing 2 to 1 multiplexing; and
  output the aligned data.

EXAMPLE EMBODIMENT 2. The electronic device of example embodiment 1, wherein the receiver comprises:
  gearbox circuitry configured to receive the data from the second device; and
  sync header detection and alignment circuitry configured to determine a location of the sync header.

EXAMPLE EMBODIMENT 3. The electronic device of example embodiment 2, wherein:
  the gearbox circuitry comprises a data buffer configured to store a portion of the data; and
  the gearbox circuitry is configured to store the portion of the data in a particular configuration.

EXAMPLE EMBODIMENT 4. The electronic device of example embodiment 3, wherein sync header detection and alignment circuitry is configured to:
  determine an adjustment to be made based on the location of the sync header; and
  provide an indication of the adjustment to the gearbox circuitry.

EXAMPLE EMBODIMENT 5. The electronic device of example embodiment 4, wherein the gearbox circuitry is configured to store the portion of the data in the particular configuration based on the indication of the adjustment.

EXAMPLE EMBODIMENT 6. The electronic device of example embodiment 3, wherein the gearbox circuitry is configured to output semi-aligned data comprising at least one complete sync header.

EXAMPLE EMBODIMENT 7. The electronic device of example embodiment 6, wherein the sync header detection and alignment circuitry comprises multiplexer circuitry configured to:
  receive the semi-aligned data; and
  generate the aligned data by performing the 2 to 1 multiplexing.

EXAMPLE EMBODIMENT 8. The electronic device of example embodiment 7, wherein:
  the sync header detection and alignment circuitry comprises a data register configured to store a portion of previous data; and
  the multiplexer circuitry receives the portion of the previous data.

EXAMPLE EMBODIMENT 9. The electronic device of example embodiment 8, wherein the aligned data comprises the portion of the previous data.

EXAMPLE EMBODIMENT 10. The electronic device of example embodiment 8, wherein the data register is configured to store only a single bit of data.

EXAMPLE EMBODIMENT 11. The electronic device of example embodiment 1, wherein the electronic device comprises a programmable logic device.

EXAMPLE EMBODIMENT 12. The electronic device of example embodiment 11, wherein the programmable logic device comprises a field-programmable gate array (FPGA) or an application specific integrated circuit (ASIC).

EXAMPLE EMBODIMENT 13. A computer-implemented method for aligning received data, the method comprising:
  receiving, via an integrated circuit, data from an electronic device, wherein the data comprises a plurality of blocks, wherein the plurality of blocks comprises a plurality of sync headers;
  determining, via the integrated circuit, a location of at least one sync header of the plurality of sync headers;
  generating, via the integrated circuit, semi-aligned data based on the location of the at least one sync header;
  generating, via the integrated circuit, aligned data by multiplexing the semi-aligned data; and
  outputting the aligned data.

EXAMPLE EMBODIMENT 14. The computer-implemented method of example embodiment 13, wherein the semi-aligned data has one of only two possible configurations.

EXAMPLE EMBODIMENT 15. The computer implemented method of example embodiment 13, wherein generating the aligned data comprises multiplexing the semi-aligned data and previous data received by the integrated circuit prior to the data, wherein the previous data consists of a last bit of the previous data.

EXAMPLE EMBODIMENT 16. The computer implemented method of example embodiment 13, wherein the aligned data comprises at least sixty-six bits of data with a sync header locating at a first and second bit of the at least sixty-six bits of data.

EXAMPLE EMBODIMENT 17. A data processing system comprising:
an electronic device configured to generate data, wherein the data comprises a plurality of blocks, wherein the plurality of blocks comprises a plurality of sync headers;
an integrated circuit device communicatively coupled to the electronic device, wherein the integrated circuit device is configured to:
determine a location of at least one sync header of the plurality of sync headers;
generate semi-aligned data based on the location of the at least one sync header;
generate aligned data by multiplexing the semi-aligned data; and
output the aligned data.

EXAMPLE EMBODIMENT 18. The data processing system of example embodiment 17, wherein the integrated circuit device is configured to generate the aligned data by performing 2 to 1 multiplexing of the semi-aligned data.

EXAMPLE EMBODIMENT 19. The data processing system of example embodiment 17, wherein the electronic device and the integrated circuit device are included on a single package substrate.

EXAMPLE EMBODIMENT 20. The data processing system of example embodiment 19, wherein the integrated circuit device comprises a programmable logic device.

The embodiments set forth in the present disclosure may be susceptible to various modifications and alternative forms, specific embodiments have been shown by way of example in the drawings and have been described in detail herein. However, it may be understood that the disclosure is not intended to be limited to the particular forms disclosed. The disclosure is to cover all modifications, equivalents, and alternatives falling within the spirit and scope of the disclosure as defined by the following appended claims. In addition, the techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . " it is intended that such elements are to be interpreted under 35 U.S.C. 112(f). For any claims containing elements designated in any other manner, however, it is intended that such elements are not to be interpreted under 35 U.S.C. 112(f).

What is claimed is:

1. An electronic device comprising:
a receiver comprising:
gearbox circuitry comprising a data buffer, wherein the gearbox circuitry is configured to:
receive data from a second electronic device, wherein the data comprises a plurality of blocks, wherein each block of the plurality of blocks comprises a sync header; and
store a portion of the data in a particular configuration in the data buffer; and
sync header detection and alignment circuitry comprising multiplexer circuitry, wherein the sync header detection and alignment circuitry is configured to:
determine a location of the sync header;
determine an adjustment to be made based on the location of the sync header; and
provide an indication of the adjustment to the gearbox circuitry; and
align the data by performing 2 to 1 multiplexing via the multiplexer circuitry; and
output the aligned data.

2. The electronic device of claim 1, wherein the gearbox circuitry is configured to store the portion of the data in the particular configuration based on the indication of the adjustment.

3. The electronic device of claim 1, wherein the gearbox circuitry is configured to output semi-aligned data comprising at least one complete sync header.

4. The electronic device of claim 3, wherein the sync header detection and alignment circuitry comprises the multiplexer circuitry configured to:
receive the semi-aligned data; and
generate the aligned data by performing the 2 to 1 multiplexing.

5. The electronic device of claim 4, wherein:
the sync header detection and alignment circuitry comprises a data register configured to store a portion of previous data; and
the multiplexer circuitry receives the portion of the previous data.

6. The electronic device of claim 5, wherein the aligned data comprises the portion of the previous data.

7. The electronic device of claim 5, wherein the data register is configured to store only a single bit of data.

8. The electronic device of claim 1, wherein the electronic device comprises a programmable logic device.

9. The electronic device of claim 8, wherein the programmable logic device comprises a field-programmable gate array (FPGA) or an application specific integrated circuit (ASIC).

10. The electronic device of claim 1, wherein the multiplexer circuitry is configured to:
determine a configuration of the data based on a registered bit of the data; and
align the data based on the configuration.

11. The electronic device of claim 1, wherein the multiplexer circuitry is configured to receive two bits of the data and output one bit of the data.

12. The electronic device of claim 1, wherein the aligned data comprises the sync header in a same bit position at each block of the plurality of blocks.

13. The electronic device of claim 1, wherein the multiplexer circuitry is configured to receive 133 bits of the data and output 132 bits of the aligned data.

* * * * *